H. E. BARR.
AIR COMPRESSOR.
APPLICATION FILED NOV. 2, 1910.

1,008,519.

Patented Nov. 14, 1911.

Harry Ed. il Barr
Inventor

Witnesses
J. M. Mason
J. M. Sheridan

UNITED STATES PATENT OFFICE.

HARRY EDSIL BARR, OF ERIE, PENNSYLVANIA.

AIR-COMPRESSOR.

1,008,519.  Specification of Letters Patent.  Patented Nov. 14, 1911.

Application filed November 2, 1910. Serial No. 590,332.

*To all whom it may concern:*

Be it known that I, HARRY EDSIL BARR, a citizen of the United States, residing at Erie, in the county of Erie and State of Pennsylvania, have invented new and useful Improvements in Air-Compressors, of which the following is a specification.

The object of the invention is to produce a compressor which shall give the advantages of two-stage compression, in a single unit (not duplex), with the minimum of parts and least possible floor space, this space not being increased, regardless of whether compressor be driven by belt or self-contained driving means, as a steam or gas power cylinder, electric or other motor. As compared with compressors as now built I have eliminated all but one air head; piston rod with separate pistons mounted thereon, all glands and stuffing boxes necessary with a piston rod, a long bed with crosshead and guides for same, separate tie piece between cylinders with multitudinous bolting or stud fastenings etc.; thus producing a very short machine of simple construction and which compresses in two stages with cylinders in absolutely fixed alinement.

The invention includes the construction and arrangement of compressing cylinder with its piston and parts, which make possible two-stage compression with the simplicity and small space described and also the use with this cylinder of a form of crank case or bed which permits any driving motor to be assembled on its top instead of being added in such a way as to directly increase the length or width of compressor as in the usual construction—thus furthering the idea and accomplishment of minimum floor space.

Figure 1:
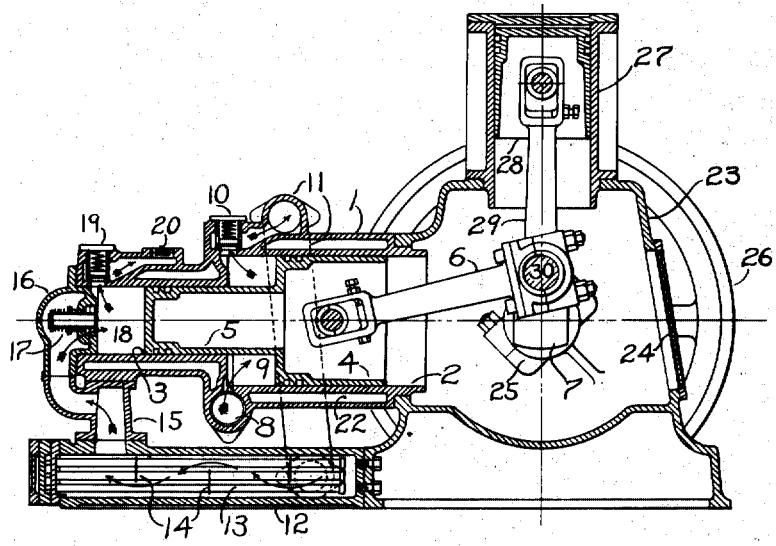

In Figure 1—1 is the compressing cylinder the bore of which has two differential diameters, (2) and (3) of proper ratio, and in which reciprocate the corresponding differential diameters (4) and (5) of piston. Connecting rod (6) connects piston directly with crankshaft (7) of machine. The outer end of large bore is toward crank shaft and is open except as closed by the piston. A low pressure space is thus formed at (9) by the differential diameters of cylinder and piston, into which air is admitted by inlet valve (8) operated from crank shaft by rod (21) although any suitable type of valve may be used. Discharge valves (10) permit air to pass into pipe (11) as piston completes its compress ng stroke, thence into cooler (12) where it is passed in contact with water cooled pipes (13) several times by baffles (14). Stand (15) supports outer end of compressing cylinder and is a continuation of the air passage from cooler, the air entering head (16), which closes outer end of small bore, passing through inlet valve (17) into high pressure space (18) from which it is expelled by piston through discharge valves (19) and opening (20). Space (22) Fig. 1 is the water jacket. Crankcase (23) is preferably of the box type with necessary openings closed by plates as (24). Bearings (25) supported by crankcase, carry the crankshaft (7) with balance wheels (26). (27) is a steam or gas-power cylinder supported by crankcase on its top, (28) is a piston therein, connected with and adapted to drive crankshaft (7) by connecting rod (29) which engages shaft on its one crank pin (30). The power cylinder (27) is single acting, taking pressure on its upper end only. In addition to retaining the minimum floor space this position of a power cylinder gives a much smoother action and smaller shocks on the machine, as period of effort in same is practically co-incident with period of resistance in compressing cylinder, which is not the case with the usual construction and heavy strains are transmitted backward and forward between compressing cylinder and balance wheels.

Figure 2:
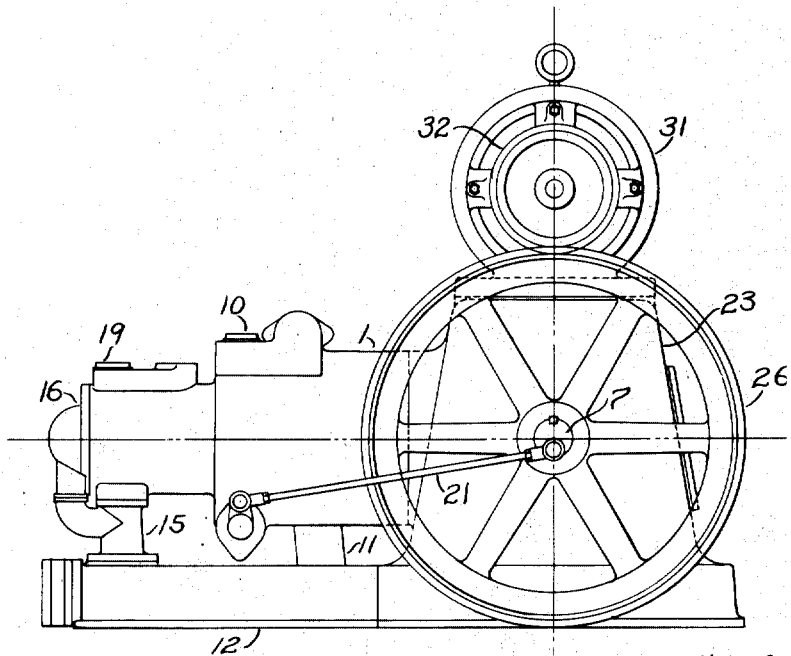

In Fig. 2 the same machine is shown but with an electric or other rotary motor supported by crankcase (23) on its top and adapted to drive crankshaft (7) by pinion (32) which meshes with wheel (26). Any other form of connection may be used however, as belt, chain etc. Motor is at (31).

I claim:—

In an air compressor, the combination of a horizontal, single acting, two-stage air cylinder having two different diameters of bore in line with each other end to end; a piston working therein having corresponding differential diameters and forming a low-pressure space within the large bore; an oscillating inlet valve below the low-pressure space and controlling a port thereto; puppet discharge valves above the low-pressure space and controlling ports therefrom; the outer end of the large bore being open except as closed by the piston; a head closing the outer end of the small bore and forming a high-pressure space within the small bore; a puppet inlet valve in the head controlling an opening to the high-pressure space; a chamber in the head comprising part of the passage from the low-pressure space to the high-pressure space; puppet discharge valves above the high-pressure space and controlling ports therefrom, a bed supporting the open end of the air cylinder; bearings in the bed carrying a crank shaft and balance wheels; a connecting rod between the piston and the crank shaft; a box extending under the cylinder and rigidly but separably connected with the bed; cooled surfaces within the box; a connection from the low-pressure discharge passage to the bed end of the cooler box; a support under the high-pressure end of the cylinder, said support resting on the cooler box and the interior of support and box comprising part of, and completing the passage from the low-pressure space to the high-pressure space substantially as shown and described.

HARRY EDSIL BARR.

Witnesses:
  G. M. MASON,
  I. M. SHERIDAN.